US010032475B2

(12) United States Patent
Prins et al.

(10) Patent No.: US 10,032,475 B2
(45) Date of Patent: Jul. 24, 2018

(54) ENHANCING AN AUDIO RECORDING (71) Applicants: Koninklijke KPN N.V., Rotterdam (NL); Nederlandse Organisatie Voor Toegepast-Natuurwetenschappelijk Onderzoek TNO, The Hague (NL)

(72) Inventors: Martin Prins, The Hague (NL); Hans Maarten Stokking, Wateringen (NL); Omar Aziz Niamut, Vlaardingen (NL)

(73) Assignees: KONINKLIJKE KPN N.V., Rotterdam (NL); NEDERLANDSE ORGANISATIE VOOR TOEGEPAST-NATUURWETENSCH APPELIJK ONDERZOEK TNO, The Hague (NL)

( * ) Notice: Subject to any disclaimer, the term of this patent is extended or adjusted under 35 U.S.C. 154(b) by 0 days.

(21) Appl. No.: 15/385,329

(22) Filed: Dec. 20, 2016

(65) Prior Publication Data
US 2017/0186463 A1 Jun. 29, 2017

(30) Foreign Application Priority Data
Dec. 28, 2015 (EP) .................................. 15202791

(51) Int. Cl.
*H04B 15/00* (2006.01)
*G11B 20/10* (2006.01)
(Continued)

(52) U.S. Cl.
CPC .......... *G11B 20/10527* (2013.01); *G06F 3/16* (2013.01); *G06F 17/30743* (2013.01);
(Continued)

(58) Field of Classification Search
CPC ..... G11B 20/10527; G11B 20/22; G06F 3/16; H06F 17/30743; G10H 1/0033;
(Continued)

(56) References Cited

U.S. PATENT DOCUMENTS

2012/0294452 A1    11/2012  MacDonald et al.
2014/0105411 A1    4/2014   Santos et al.
(Continued)

FOREIGN PATENT DOCUMENTS

EP    2 779 162 A2    9/2014
GB    2 483 370       3/2012
(Continued)

OTHER PUBLICATIONS

K. Reindl, et al., "An Acoustic Front-End for Interactive TV Incorporating Multichannel Acoustic Echo Cancellation and Blind Signal Extraction," Asilomar, pp. 1716-1719 (2010).
(Continued)

*Primary Examiner* — Leshui Zhang
(74) *Attorney, Agent, or Firm* — Hamilton, Brook, Smith & Reynolds, P.C.

(57) ABSTRACT

A system and method are provided for enhancing an audio recording which comprises a recording of a sound signal obtained from the play-out of an audio signal via a speaker. The audio signal, and thereby the sound signal, may represent certain audio content, e.g., a radio station or TV audio. To perform the enhancing, the recording of the sound signal is suppressed using the audio signal, thereby obtaining an intermediate audio recording. An original version of the audio content is then added to the intermediate audio recording to obtain an enhanced audio recording. This original version is generally of higher quality as it generally does not represent a background audio component but rather was purposefully recorded or generated.

17 Claims, 6 Drawing Sheets (51) Int. Cl.
*G06F 3/16* (2006.01)
*G06F 17/30* (2006.01)
*G11B 20/22* (2006.01)
*G10H 1/00* (2006.01)
*G10H 1/36* (2006.01)
*H04R 3/04* (2006.01)
*G10L 21/02* (2013.01)
*G10L 21/0208* (2013.01)
*H04R 27/00* (2006.01)
*G10L 19/018* (2013.01)

(52) U.S. Cl.
CPC .......... G10H 1/0033 (2013.01); G10H 1/361 (2013.01); G10L 21/0202 (2013.01); G11B 20/22 (2013.01); H04R 3/04 (2013.01); *G10H 2240/041* (2013.01); *G10L 19/018* (2013.01); *G10L 21/0208* (2013.01); *H04R 27/00* (2013.01); *H04R 2227/003* (2013.01); *H04R 2227/009* (2013.01); *H04R 2430/01* (2013.01)

(58) Field of Classification Search
CPC .............. G10H 1/361; G10H 2240/041; G10L 21/0208; G10L 21/02087; G10L 21/02161; G10L 21/02163; G10L 21/02165; G10L 21/02168; G10L 21/0264; G10L 21/0272; G10L 21/0308; G10L 21/0224; G10L 21/0316; G10L 21/0324; G10L 21/0332; G10L 21/034; G10L 21/045; G10L 2021/02163; H04R 3/005; H04S 3/02; H04S 3/008; H04S 3/006; H04S 3/004; H04S 3/002; H04S 2400/09; H04S 2400/15; H04S 2400/13; H04S 1/007; H04S 1/002; H04S 1/005
USPC .... 381/94.1–94.9, 95–103, 91, 93, 86, 73.1, 381/74, 71.1–71.14; 704/E19.013, 704/E21.002, E21.006, E21.007; 455/501, 63.1, 67.13, 570, 114.2, 283, 455/287, 296; 700/94
See application file for complete search history.

(56) References Cited

U.S. PATENT DOCUMENTS

2014/0180685 A1 6/2014 Ono et al.
2015/0039646 A1* 2/2015 Sharifi ............... H04N 21/4394
707/769
2017/0034640 A1* 2/2017 Kirsch ..................... H04R 5/04
2017/0213567 A1* 7/2017 Stokking ............. G10L 21/0208

FOREIGN PATENT DOCUMENTS

| WO | WO 2001/75863 | 10/2001 |
| WO | WO 2009/110809 | 9/2009 |
| WO | WO 2012/020394 A2 | 2/2012 |
| WO | WO 2013/144347 | 10/2013 |
| WO | WO 2016/016387 A1 | 2/2016 |

OTHER PUBLICATIONS

European Search Report for EP 15202791.8, dated Jul. 19, 2016.
A. Alexander and O., Forth, "'No, Thank you, for the music': An application of audio fingerprinting and automatic music signal cancellation for forensic audio enhancement," *Research and Development, Oxford Wave Research, Ltd.* (2 pages).
Alexander, A., et al., "'Music and Noise Fingerprinting and Reference Cancellation Applied to Forensic Audio Enhancement," Audio Engineering Society, 46th Conference on Audio Forensics, Denver, CO, Jun. 2012.
Szwoch, G., et al., "A Double-Talk Detector Using Audio Watermarking," *J. Audio., Eng., Soc.*, 57(11): 916-926 (2009).
Tashev, Dr., Ivan, "Audio for Kinect: pushing it to the limit," Crest Symposium on Human-Harmonized Information Technology, 22 pages (2012).

* cited by examiner

ENHANCING AN AUDIO RECORDING

RELATED APPLICATION

This application claims priority under 35 U.S.C. § 119 or 365 to European Application No. 15202791.8, filed Dec. 28, 2015. The entire teachings of the above application are incorporated herein by reference.

TECHNICAL FIELD

The invention relates to a method and system for enhancing an audio recording. The invention further relates to a sender device or receiver device for use in the system. The invention further relates to a computer program product comprising instructions for causing a processor system to perform the method.

BACKGROUND

It often occurs that audio recordings comprise recordings of sound signals generated by a means for producing sound output, henceforth referred to simply as 'speaker'. For example, when recording speech of a person, the sound signal generated by the speaker of a television or radio playing in the background may be recorded as well. In many cases, such an audio recording is not primarily made to record the sound signal generated by the speaker. Rather, the audio recording may be directed at another sound signal, e.g., that of the person speaking. As such, the sound signal generated by the speaker may be considered a "background" audio component of the audio recording whereas another sound signal, e.g., that of the person speaking, may be considered a "foreground" audio component of the audio recording.

An audio recording may also more structurally include recordings of "background" sound signals generated by speakers. For example, in Social TV, users which are remote from each other may watch a same television program while communicating with each other via audio (e.g., via Voice-over-IP) or video (e.g., Skype, Lync, WebRTC, FaceTime), with the latter also including audio communication. This way, the users may jointly watch, discuss and comment on the television program, even being remote from each other. However, as a result, each user will typically also hear the audio of the television of the other user playing in the background.

The background audio component may be of relatively poor quality in the audio recording. There may be a number of reasons for this, including but not limited to the microphone being typically directed at the "foreground" sound source rather than the "background" sound source, i.e., the speaker generating the sound signal, the codec of the audio encoder being optimized for the foreground audio component (e.g., speech) rather than the background audio component (e.g., music), and there being an additional 'digital-to-sound-to-digital' conversion step, caused by the reproduction by the loudspeaker and the subsequent recording by a microphone.

It is known to remove or attenuate such a background audio component in the audio recording, for example as described in PCT/EP2015/067548.

However, although the recording of the sound signal may not be the primary intent of the audio recording, it may nevertheless be desirable to reproduce the audio content represented by the sound signal when playing-out the audio recording. Namely, by removing a background audio component, the context of the foreground audio component may be inadvertently removed as well. To nevertheless improve the quality of the recording of the sound signal in the audio recording, one could opt to increase the quality of the audio recording, e.g., by applying suitable audio processing. However, such audio processing rarely obtains sufficiently good results.

SUMMARY

It would be advantageous to obtain a system or method for enhancing an audio recording which comprises a recording of a sound signal generated by a speaker, thereby obtaining an enhanced audio recording.

In accordance with a first aspect of the invention, a method may be provided for enhancing an audio recording. The method may comprise:
accessing the audio recording, the audio recording comprising at least a recording of a sound signal, the sound signal being obtained from a play-out of an audio signal via a speaker, the audio signal representing audio content;
accessing the audio signal;
suppressing, in the audio recording, the recording of the sound signal using the audio signal, thereby obtaining an intermediate audio recording;
adding an original version of the audio content to the intermediate audio recording to obtain an enhanced audio recording, the original version of the audio content being the audio signal or another original version of the audio content.

In accordance with another aspect of the invention, a transitory or non-transitory computer-readable medium may be provided comprising a computer program. The computer program may comprise instructions for causing a processor system to perform the method.

In accordance with another aspect of the invention, a system may be provided for enhancing an audio recording. The system may comprise:
a first input interface configured for accessing the audio recording, the audio recording comprising at least a recording of a sound signal, the sound signal being obtained from a play-out of an audio signal via a speaker, the audio signal representing audio content;
a second input interface configured for accessing the audio signal; and
a processor system configured for:
suppressing, in the audio recording, the recording of the sound signal using the audio signal, thereby obtaining an intermediate audio recording, and
adding an original version of the audio content to the intermediate audio recording to obtain an enhanced audio recording, the original version of the audio content being the audio signal or another original version of the audio content.

In accordance with other aspects of the invention, a sender device and a receiver device may be provided for use in the system.

The above aspects of the invention involve obtaining an audio recording which comprises a recording of a sound signal obtained from a play-out of an audio signal via a speaker. Here, the term 'sound signal' refers to an audible signal, and the term 'audio signal' refers to an electronic representation of such a sound signal. The sound signal is thus a rendering of the audio signal by the speaker in audible form. By way of the audio recording, an electronic representation of the sound signal is obtained. As such, rather than directly comprising the audio signal, the audio recording comprises a recording of the rendering of the audio signal by the speaker.

The audio recording comprises 'at least' the recording of the sound signal in that it may, or may not, comprise recordings of other sound signals. In the former case, the sound signal may be combined with the other sound signals in the recorded signal, yielding an audio recording representing several sound signals. In a specific example, the sound signal may represent a background audio component, with another sound signal, e.g., speech of a person, representing a foreground audio component.

The audio signal itself is accessed. Such access may be a remote access, from an external resource location, with the term 'external' referring to the resource location being separate of the system. The audio signal may thus be retrieved from the external resource location, e.g., via a network. For example, an audio stream may be accessed which comprises the audio signal in encoded form. Having obtained access to the audio signal, the recording of the sound signal is then suppressed in the audio recording, namely using the audio signal. Techniques for attenuating or even removing the recording of the sound signal in the audio recording on the basis of the audio signal being separately provided are known per se in the art of audio processing. For example, the audio signal may be subtracted from the audio recording. As a result, an intermediate audio signal is obtained in which the sound signal is suppressed.

An original version of the audio content represented by the audio signal is then accessed. Here, the term 'original version' refers to a version of the audio content which is not obtained by the indirection of a microphone recording of the rendering of an audio signal by a speaker in audible form. Rather, an original version represents a version which is originally recorded or generated. The original version may be the audio signal itself. A non-limiting example is that, if the sound signal is obtained by play-out of an audio stream, the same audio stream may be accessed. However, the original version may also be another original version, for example a different version of the same song. A non-limiting example may be that the audio signal originally played-out may be a mono recording of a song, in which case the stereo recording of the same song would then represent another original version of the audio content.

The original version of the audio content is then inserted into the intermediate audio signal, e.g., by mixing the original version of the audio content into one or more existing audio tracks of the intermediate audio signal, or by inserting the original version of the audio content into one or more additional audio tracks.

The above aspects of the invention have as effect that in the audio recording, the recording of the sound signal is replaced with a version of the sound signal's audio content which is originally recorded or generated. This original version may be generally of higher quality as it generally does not represent a "background" audio component but rather was purposefully recorded or generated. Also, an additional 'digital-to-sound-to-digital' conversion step, caused by the reproduction by the speaker and the subsequent recording by a microphone, may be avoided, being another possible reason for the audio signal having a poor quality in the audio recording. As a result, an enhanced audio recording is obtained, in which the audio content represented by the audio signal is present with a better quality. For example, the audio content may be more clearly present in the enhanced audio recording. A specific example is that if the audio content comprises vocal components, the vocal components may be more intelligible. Another specific example is that if the audio content represents music, the music may sound better to listeners, etc. In general, the audio content may have an improved quality in the enhanced audio recording according to one or more quality metrics, such as a signal-to-noise ratio or a similarity metric expressing the similarity to the original version of the audio content.

It is noted that examples of local or remote play-out devices can include, but are not limited to, audio systems, televisions, monitors, projectors, media players and recorders, set-top boxes, smartphones, PCs, laptops, tablet devices, etc. Examples of recording devices include, but are not limited to, audio recorders, compact cameras, professional cameras, smartphones, tablet devices, smart watches, smart glasses, etc.

In an embodiment, accessing the audio signal may comprise:
  analyzing the audio recording to identify the audio signal;
  based on the audio signal having been identified, identifying a resource location which comprises the audio signal; and
  accessing the audio signal from the resource location.

Although several possibilities exist for accessing the audio signal, it may at times be needed or desired to first identify the audio signal in the audio recording before being able to access the audio signal. For example, if there are multiple audio streams available at a resource location, each representing a different audio signal, it may be that the appropriate audio stream can only be retrieved after the audio signal in the audio recording has been identified. Having identified the audio signal in the audio recording, a resource location may then be identified which comprises the audio signal. Here, the term 'resource' may refer to a server, storage medium, broadcast channel, etc., whereas the 'resource location' may represent information which allows the resource to be accessed, such as an internet address, for example an URL address.

In an embodiment, identifying the audio signal may comprise:
  applying an automatic content recognition technique, such as a watermark detection technique or fingerprinting technique, to the audio recording to obtain an identification of the audio content; and
  identifying the audio signal using the identification of the audio content.

The audio content may be identified by applying an automatic content recognition technique to the audio recording. Such automatic content recognition is known per se. An advantage of using automatic content recognition may be that it may not be needed to obtain further information from the recording location, such as play-out information from a play-out device playing-out the audio content via a speaker, to identify the audio content. Effectively, no additional information may be needed from such a play-out device. It is noted that the automatic content recognition may still involve information exchange with other entities, such as a content recognition database. Any suitable automatic content recognition technique may be used as known per se from the field of automatic content recognition, including those based on watermarking and/or fingerprinting. It is noted that the automatic content recognition may take additional or other information into account besides the audio recording itself. For example, the audio content may be associated with visual content which may be identified by making use of a visual watermark embedded in the video content. As such, the audio content may be implicitly identified by identifying the video content.

In an embodiment, the sound signal may be obtained from the play-out of the audio signal by a play-out device via the speaker, and identifying the audio signal may comprise obtaining play-out information from the play-out device which is indicative of the audio signal. The sound signal may represent a play-out by a play-out device, such as a connected media player. As such, the sound signal, and thereby the audio signal, may be identified with the aid of the play-out device. In particular, play-out information may be used which may be generated by the play-out device and may be indicative of the played-out audio signal. For example, the play-out information may identify an audio stream including the resource location at which the audio stream is available. Another example is that the play-out information may identify a program title.

In an embodiment, obtaining the play-out information may comprise at least one of:
  querying the play-out device via a network for the play-out information; and
  the play-out device sending the play-out information via the network.

With the ubiquity of connected play-out devices, it has become possible to obtain the play-out information from such a play-out device via a (local) network. For example, the play-out device may broadcast or otherwise send their current activity, e.g., using multicast DNS, DLNA, DIAL or other media protocols. The play-out device may be queried for the play-out information, e.g., using the same or similar protocols.

In an embodiment, the method may further comprise accessing timing information enabling the audio signal to be correlated in time with the recording of the sound signal, and suppressing the recording of the sound signal may comprise:
  synchronizing the audio signal with the recording of the sound signal using the timing information to obtain a synchronized version of the audio signal; and
  suppressing, in the audio recording, the recording of the sound signal using the synchronized version of the audio signal.

Here, the term 'correlated in time' refers to the relation in time between both signals having been determined, or at least to an approximate degree, thereby enabling the recording of the sound signal to be aligned in time with the audio signal from which it originated. The audio signal may then be synchronized with the recorded signal based on the timing information. For example, such synchronization may comprise altering timestamps of the audio signal and/or the recorded signal, or generating synchronization data representing a time difference between the audio signal and the recorded signal. Here, the term 'synchronizing' refers to a synchronization to a degree which is deemed suitable for subsequent suppression of the sound signal, being typically in the milliseconds range. In this respect, it is noted that noise suppression techniques are known, and may be used to suppress the sound signal (being effectively considered as a "noise" signal), which are capable of compensating for 'smaller' delays between input signals, e.g., up to 128 ms. An example of such a technique is noise suppression using adaptive filters. However, if the synchronization is reasonably precise, a simpler noise suppression technique may be used, e.g., using shorter adaptive filters, requiring fewer iterations, etc. For example, the synchronized audio signal may be simply subtracted from the audio recording, preferably after adjusting one or more properties of the synchronized audio signal to match those of the recording of the sound signal in the audio recording.

In an embodiment, the method may further comprise adding the synchronized version of the audio signal to the intermediate audio recording; or synchronizing the other original version of the audio content to the audio recording to obtain a synchronized other original version, and adding the synchronized other original version to the intermediate audio recording. The original version of the audio content may be synchronized prior to adding it to the intermediate audio signal. It will be appreciated that the desired level of synchronicity may depend on the use case. For example, when the audio content is only part of the ambiance, a coarse synchronization to the level of seconds or even tens of seconds may suffice. In other use cases, it may be desirable to obtain a level of synchronicity within milliseconds. To obtain such synchronization, timing information of a similar type may be used as used to synchronize the audio signal to the audio recording. It will be appreciated that the original version of the audio content may also be synchronized to another sound signal. For example, when the enhanced audio recording is transmitted to a remote location where the audio signal is also being played out, thereby obtaining a remote sound signal, the original version of the audio content may be synchronized to the remote sound signal. For that purpose, the play-out timing of the audio signal at the remote location may be measured, in a manner known per se in the art.

In an embodiment, the adding of the original version of the audio content to the intermediate audio recording may comprise inserting the original version into the audio recording as one or more additional audio tracks. By inserting the original version into the audio recording as one or more additional audio tracks, rather than mixing the original version into one or more existing audio tracks, the audio properties of the intermediate audio signal may be adjusted independently from those of the original version of the audio content, e.g., in the enhanced audio recording or upon play-out. For example, if the intermediate audio signal represents a foreground audio component in the form of speech whereas the audio content represents background music, the volume of the speech may be increased to improve the intelligibility of the speech.

In an embodiment, the method may further comprise encoding the one or more additional audio tracks using different encoding properties than used for encoding other audio tracks of the intermediate audio recording, the different encoding properties being preferably a different codec or a different bitrate setting. The encoding may thus be optimized for the type of audio represented by either the intermediate audio recording or the audio content, the importance of the respective track or other differing audio properties. For example, when the intermediate audio signal represents a foreground audio component in the form of speech whereas the audio content represents a background audio component in the form of music, a speech codec may be used to encode the speech whereas a music or generic codec may be used to encode the music. Another example is that the music (or in general the background audio component) may be encoded using a lower encoding bitrate than the speech (or in general the foreground audio component) when the latter is deemed more important.

In an embodiment, the method may further comprise adjusting one or more audio properties of the original version of the audio content or of the intermediate audio recording, the one or more audio properties being at least one: a volume, a timing, a pitch, a balance between frequency components, and a parameter used in a parametric audio representation. For example, the audio properties of the original version of the audio content may be adjusted to better match at least one of the audio properties of the initial recording of the sound signal, e.g., to avoid the enhanced audio signal from sounding unnatural. Another example is that the audio properties of the original version of the audio content or those of the foreground audio component may be adjusted to obtain a better differentiation between the foreground audio component, as represented by the intermediate audio signal, and the background audio component, as represented by the original version of the audio content. For example, if the intermediate audio signal represents a foreground audio component in the form of speech whereas the audio content represents background music, the volume of the speech may be increased to improve the intelligibility of the speech.

In an embodiment, the audio recording may be obtained by a sender device for transmission to a receiver device, the suppressing of the recording of the sound signal in the audio recording may be performed by the receiver device, and the method may further comprise:

the sender device retrieving and subsequently transmitting the audio signal to the receiver device; or the sender device transmitting metadata to the receiver device which is indicative of a resource location from which the audio signal is accessible, and the receiver device retrieving the audio signal from the resource location based on the metadata.

Rather than being performed by a single device, the method may also be performed using several devices, such as those of a sender/receiver system in which the audio recording may be obtained by a sender device for transmission to a receiver device, with the receiver device then replacing the recording of the sound signal with an original version of the audio content. An example of such a system is a videoconferencing system. In this particular example, each videoconferencing client may act both as a sender device for the transmission of a locally recorded media stream, and as a receiver device for the reception of remotely recorded media stream(s). However, there may also be a unilateral transmission of a media recording from a sender device to a receiver device. In general, several possibilities exist for the receiver device being enabled to retrieve an original version of the audio content from the resource location. For example, the sender device may retrieve and subsequently transmit the original version of the audio content to the receiver device, or may transmit metadata to the receiver device which is indicative of a resource location from which the original version of the audio content is accessible. In general, the receiver device may be a remote play-out device which remotely plays-out the enhanced audio recording. However, the receiver device may also be an intermediate device further transmitting the enhanced audio recording to one or more play-out devices, or one or more intermediate devices operating together, e.g., to perform cloud processing.

In an embodiment, the system may comprise a sender device and a receiver device, the sender device may comprise at least the first input interface, the receiver device comprises at least part of the processor system, and the sender device may be configured for retrieving and subsequently transmitting the audio signal to the receiver device; or transmitting metadata to the receiver device which is indicative of a resource location from which the audio signal is accessible, and the receiver device comprising the second input interface for retrieving the audio signal from the resource location based on the metadata. As such, the sender device may either comprise both input interfaces and retrieve and subsequently transmit the audio signal to the receiver device, or the receiver device may comprise the second input interface and use the transmitted metadata to access the audio signal from the resource location. A suppression subsystem may be part of the sender device or the receiver device and may be configured for suppressing in the audio recording, the recording of the sound signal using the audio signal to obtain the intermediate audio recording. The receiver device may comprise at least an addition subsystem configured for adding the original version of the audio content to the intermediate audio recording.

In general, a system and method may be provided for enhancing an audio recording which may comprise a recording of a sound signal obtained from the play-out of an audio signal via a speaker. The audio signal, and thereby the sound signal, may represent certain audio content, e.g., a radio station or TV audio. To perform said enhancing, the recording of the sound signal may be suppressed using the audio signal, thereby obtaining an intermediate audio recording. An original version of the audio content may be added to the intermediate audio recording to obtain an enhanced audio recording. This original version may generally be of higher quality as it generally does not represent a background audio component but rather was purposefully recorded or generated, e.g., being a high-quality studio recording.

It will be appreciated by those skilled in the art that two or more of the above-mentioned embodiments, implementations, and/or aspects of the invention may be combined in any way deemed useful.

Modifications and variations of the system, sender device, receiver device, local or remote play-out device, recording device and/or the computer program, which correspond to the described modifications and variations of the method, can be carried out by a person skilled in the art on the basis of the present description.

BRIEF DESCRIPTION OF THE DRAWINGS

These and other aspects of the invention are apparent from and will be elucidated with reference to the embodiments described hereinafter. In the drawings.

It should be noted that items which have the same reference numbers in different figures, have the same structural features and the same functions, or are the same signals. Where the function and/or structure of such an item has been explained, there is no necessity for repeated explanation thereof in the detailed description.

LIST OF REFERENCE NUMERALS

The following list of reference numbers is provided for facilitating the interpretation of the drawings and shall not be construed as limiting the claims.

010 speaker
015 sound signal
020 person
025 speech sound signal
030 audio signal
035 other original version of audio signal
040 microphone
045 audio recording
050 intermediate audio recording
055 enhanced audio recording
100 system for enhancing audio recording
110 first input interface
120 second input interface
130 processor system
140 suppression subsystem
150 addition subsystem
200 method of enhancing audio recording
210 accessing audio recording
220 accessing audio signal
230 suppressing recording of sound signal
240 adding original version of audio content
300 local play-out device
310, 312 local recording device
320 local area network
330, 332 other device
340 remote play-out device
350 media server
1000 exemplary data processing system
1002 processor
1004 memory element
1006 system bus
1008 local memory
1010 bulk storage device
1012 input device
1014 output device
1016 network adapter
1018 application

DETAILED DESCRIPTION

Figures 1, 2:
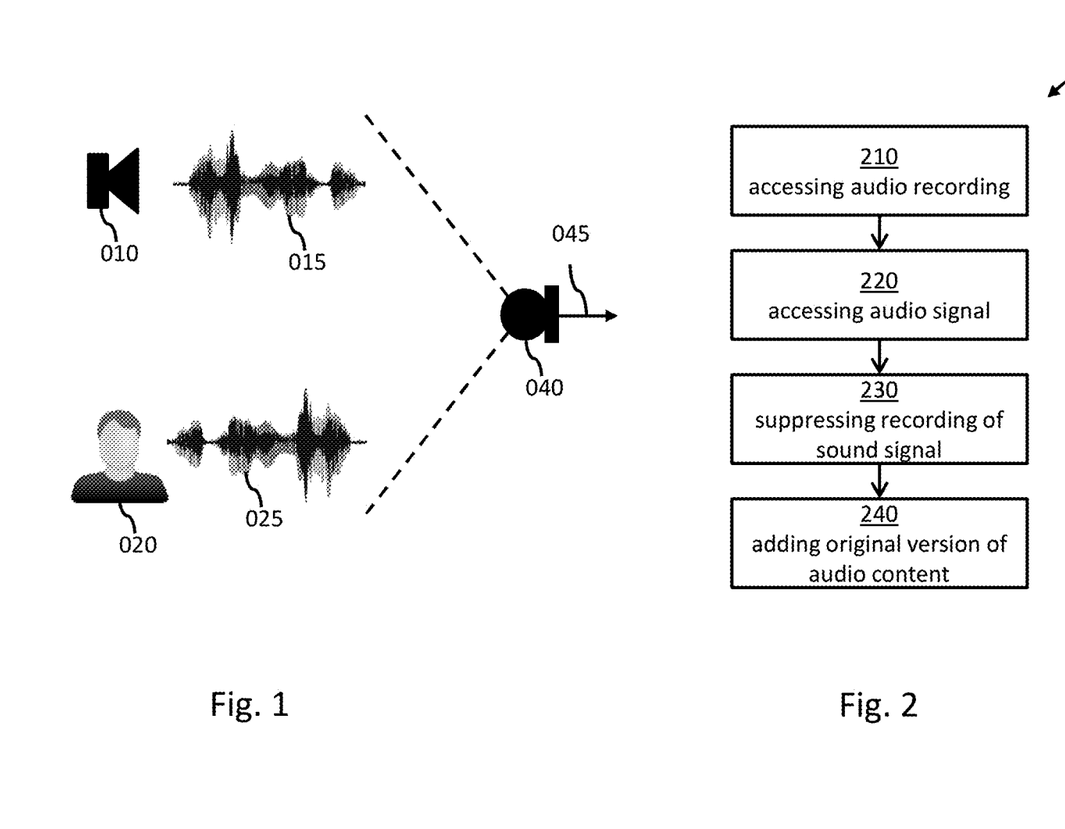
FIG. 1 illustrates a typical scenario in media recording, namely a microphone recording a person speaking while at the same time also recording a sound signal generated by the play-out of an audio signal via a speaker, thereby obtaining an audio recording which comprises a recording of speech and a recording of the sound signal.
FIG. 2 shows a method of enhancing the audio recording.

FIG. 1 illustrates a typical scenario when recording audio using a microphone, or when recording video using a camera whilst recording audio. Namely, a microphone 040 recording a person 020 speaking, and thereby his/her speech sound signal 025, may also record a sound signal 015 generated by the play-out of an audio signal via a speaker 010. As a result, an audio recording 045 may be obtained which comprises a recording of speech as well as a recording of the sound signal.

When recording such a sound signal 015, e.g., music or TV audio coming from one or more loudspeakers, its representation in the audio recording 045 is typically only of limited quality as the characteristics of the microphone will typically severely limit the recording quality. In particular, readily-available microphones, e.g., as found in current-day mobile devices, have limited capabilities compared to studio-quality microphones. Furthermore, there may be an influence of the room and possibly some influence of the loudspeaker 010. Also, the audio recording may be mono, thereby loosing directionality in audio, while most play-out devices have at least 2 loudspeakers and could thus play-out in stereo or even using surround sound.

For example, during a communication session, the sound signal 015 played-out via the speaker 010 may be considered as background audio, which may pose additional problems. Namely, as part of, or following the recording process, the captured sound may be digitized and compressed with codecs to enable efficient transport and communication. The codecs used in communication sessions are typically dedicated speech codecs which assume an underlying speech production model. Encoding generic audio, such as music, with speech codecs typically results in low quality. Furthermore, the bitrate used in communication sessions, enabled by speech-optimised codecs, is typically not sufficient to encode music with high quality. Also, the volume of the background audio and that of the foreground audio may be unbalanced. The volume balance may be considered appropriate by the person 020, but at the remote side, e.g., where the audio recording 045 is reproduced, the music may be too loud and thereby mask the reproduction of the speech sound signal 025 of the person 020, or it may be too soft when it is meant to be recorded as part of the ambiance.

When having a communication session as part of a shared-content-consumption session, e.g., remotely watching TV together or listening music together, an additional problem may occur. Namely, even when the play-out of the content is synchronized across locations, the audio of the content will be recorded as part of the communication, and played-out with some delay at the remote location(s). This typically causes an echo, causing users to hear the same audio twice with some delay in between: once directly from their own TV play-out and once as background audio in the audio received from the remote communication partner. Another effect may be audio phasing effects, which may lead to reduction of the amplitude of audio, e.g. of speech, which may hinder intelligibility.

Figure 3:
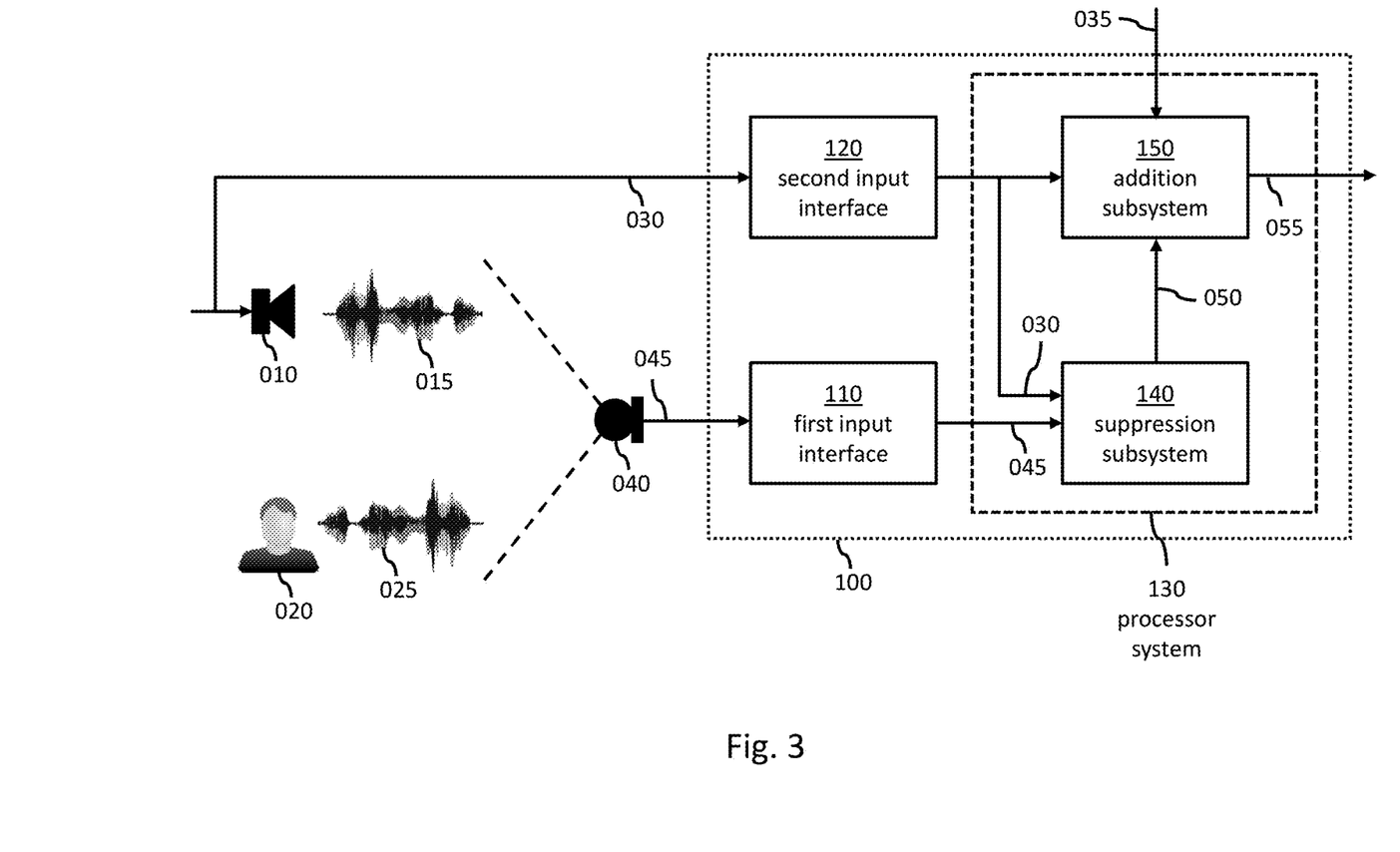
FIG. 3 shows a system for enhancing the audio recording.

FIG. 2 shows a method and FIG. 3 shows a system for enhancing an audio recording which comprises a recording of a sound signal generated by play-out via a speaker, and which may address one or more of the abovementioned problems.

In general, the method and system may be described with reference to a communication session where the audio recording is obtained locally and then transmitted for play-out at a remote location. However, the use in a communication session is not a limitation, in that the enhancement may also be performed outside the context of a communication session, e.g., in an 'offline' scenario where a stored audio recording is enhanced. For example, a user may record himself and a TV showing a TV program, and may then comment on the program, e.g., to be uploaded to YouTube. In the resulting media recording, the recording of the TV's sound may be replaced with the original audio signal, thereby enhancing the audio of the media recording.

With further reference to FIG. 1, the term 'local play-out device' may refer to a device playing out an audio signal via one or more loudspeakers 010, thereby generating a sound signal 015. Example of local play-out devices include, but are not limited to, televisions and audio systems. It is noted that the loudspeaker 010 may, but does not need to be, part of the local play-out device. The term 'local recording device' may refer to a device recording the sound signal 015, e.g. with a microphone 040, thereby obtaining an audio recording 045 which comprises a recording of the sound signal. The term 'remote receiving device' may refer to a device receiving the audio recording 045 at a remote location, e.g., via a network such as the internet. The term 'remote play-out device' may refer to a device reproducing the (enhanced) audio recording 045 remotely, e.g., via one or more loudspeakers, thereby reproducing the sound signal (or the original version of the audio signal in the enhanced audio recording). It will be appreciated that also the local play-out device may reproduce (enhanced) audio recording, e.g., in case the enhancement is performed offline and the enhanced audio recording is later played-out locally. The term 'background audio' may refer to the sound signal 015, and the fact that the sound signal 015 may be considered a background audio component in the audio recording 045. The term 'foreground audio' may refer to another sound signal, such as the speech signal 025 or another sound signal generated by another play-out device, and in general to audio different from the background audio as represented by the recording of the sound signal which is to be suppressed in the audio recording.

The terms 'recording' and 'capturing' may be used interchangeably. The terms 'play-out' and 'playback' may be used interchangeably. The audio recording may be part of a media recording, e.g., having an associated video component. In general, when describing the enhancement of the audio recording, such enhancement may also apply to the enhancement of a media recording comprising an audio recording. In view of the audio signal representing audio content, the terms 'audio signal' and 'audio content', or short 'content', may be used interchangeably. Moreover, both the audio signal and the recording of the sound signal may be referred to as 'background audio', with the context of the reference indicating whether the reference is to the audio signal or to the recording of the sound signal. The terms 'adding' and 'inserting' may be used interchangeably when referring to the original version of the audio content replacing the recording of the sound signal in the audio recording.

The following embodiments of a method and system for enhancing the audio recording are based on the insight that if one suppresses the recording of the sound signal in the audio recording, and inserts the original audio signal, or another original version of the audio content, the overall quality of experience during play-out may be improved. In addition, audio properties such as volume and time alignment may be adjusted before adding the original version of the audio content, or even thereafter when the original version of the audio content is added as one or more separate tracks. Also, the original version of the audio content may be inserted at the receiving end of a communication session, e.g., at the remote receiving device or the remote play-out device, thereby potentially saving bandwidth. Alternatively, the original version of the audio content may be inserted by a node in the network, potentially saving bandwidth in the uplink from the recording device to the network.

FIG. 2 shows a method 200 of enhancing an audio recording. The method 200 may comprise, in an operation titled "ACCESSING AUDIO RECORDING", accessing 210 the audio recording, the audio recording comprising at least a recording of a sound signal, the sound signal being obtained from a play-out of an audio signal via a speaker, the audio signal representing audio content. The method 200 may further comprise, in an operation titled "ACCESSING AUDIO SIGNAL", accessing 220 the audio signal. The method 200 may further comprise, in an operation titled "SUPPRESSING RECORDING OF SOUND SIGNAL", suppressing 230, in the audio recording, the recording of the sound signal using the audio signal, thereby obtaining an intermediate audio recording. The method 200 may further comprise, in an operation titled "ADDING ORIGINAL VERSION OF AUDIO CONTENT", adding 240 an original version of the audio content to the intermediate audio recording to obtain an enhanced audio recording, the original version of the audio content being the audio signal or another original version of the audio content.

It will be appreciated that although FIG. 2 shows the above operations 210-240 being performed sequentially, the operations may be performed in any suitable order, e.g., consecutively, simultaneously, or a combination thereof, subject to, where applicable, a particular order being necessitated, e.g., by input/output relations. For example, suppressing 230 and adding 240 may be performed simultaneously or in reverse order, e.g., when the original version of the audio content is added as one or more new tracks, in which case the suppressing may be performed independently. Another example is that accessing 210 the audio recording and accessing 220 the audio signal may be performed simultaneously or in reverse order.

A specific example of the method 200 may involve the audio recording being accessed, e.g., by accessing a resource location. The audio signal may then be accessed, for example by firstly identifying the audio content represented by the audio signal, and then retrieving the audio signal. The recording of the sound signal may then be suppressed using echo and/or noise suppression techniques as known per se in the art on the basis of the accessed audio signal. As a result, an intermediate audio recording may be obtained which primarily comprises the foreground audio. Having suppressed the recording of the sound signal, the audio signal or another original version of the audio content may be inserted, e.g., into one or more existing or new audio tracks. In contrast to the suppression, where the audio signal itself is needed in more or less exact form so as to enable the recording of the sound signal to be cancelled using known echo/noise suppression techniques, another original version of the audio content may be inserted which differs from the audio signal.

As a result, an enhanced audio recording may be obtained. The enhancement may be a result of the background audio having a higher quality. In addition, when the insertion is performed as one or more new audio tracks, the background audio may be separable adjustable from the foreground audio, e.g., by the volume, timing, equalizer settings, pitch, etc. being controllable per audio track and thus separately for foreground and background audio. Additionally, different encoding codecs and bitrate may be used per audio track, which means an optimal codec, e.g., a speech codec, may be used when encoding the foreground audio while another codec, e.g., a music codec, may be used when encoding the background audio.

FIG. 3 shows a system 100 for enhancing an audio recording in the form of a block diagram. The system 100 comprises a first input interface 110 configured for accessing the audio recording 045, the audio recording comprising at least a recording of a sound signal 015, the sound signal being obtained from a play-out of an audio signal 030 via a speaker 010, with the audio signal representing audio content. The system 100 is further shown to comprise a second input interface 120 configured for accessing the audio signal 030 or a more or less exact representation thereof (see also 'General aspects' further onwards). The system 100 further comprises a processor system 130, which may comprise a suppression subsystem 140 configured for suppressing, in the audio recording 045, the recording of the sound signal 015 using the audio signal 030, thereby obtaining an intermediate audio recording 050. The processor system 130 may further comprise an addition subsystem 150 for adding an original version of the audio content to the intermediate audio recording 050 to obtain an enhanced audio recording 055, the original version of the audio content being the audio signal 030 or another original version 035 of the audio content.

It will be appreciated that the first input interface 110 may take any suitable form, such as a network interface to a local or wide area network, a storage interface to an internal or external data storage, e.g., an internal interface in case the system 100 is part of the recording device, etc. The audio recording 045 may be pre-recorded, but may also be a real-time, 'live' stream. Although not shown in FIG. 3, the first input interface 110 may optionally comprise a decoder for decoding a stream of the audio recording 045, e.g., an audio stream or a media stream comprising an audio component, thereby making available the audio recording 045, or parts thereof, in an uncompressed or, in general, other format. Likewise, the second input interface 120 may take any suitable form, such as network interface to a local or wide area network, a storage interface to an internal or external data storage, etc. Although not shown in FIG. 3, the second input interface 120 may optionally comprise a decoder for decoding a stream of the audio signal 030, e.g., an audio stream or a media stream.

Figure 4:
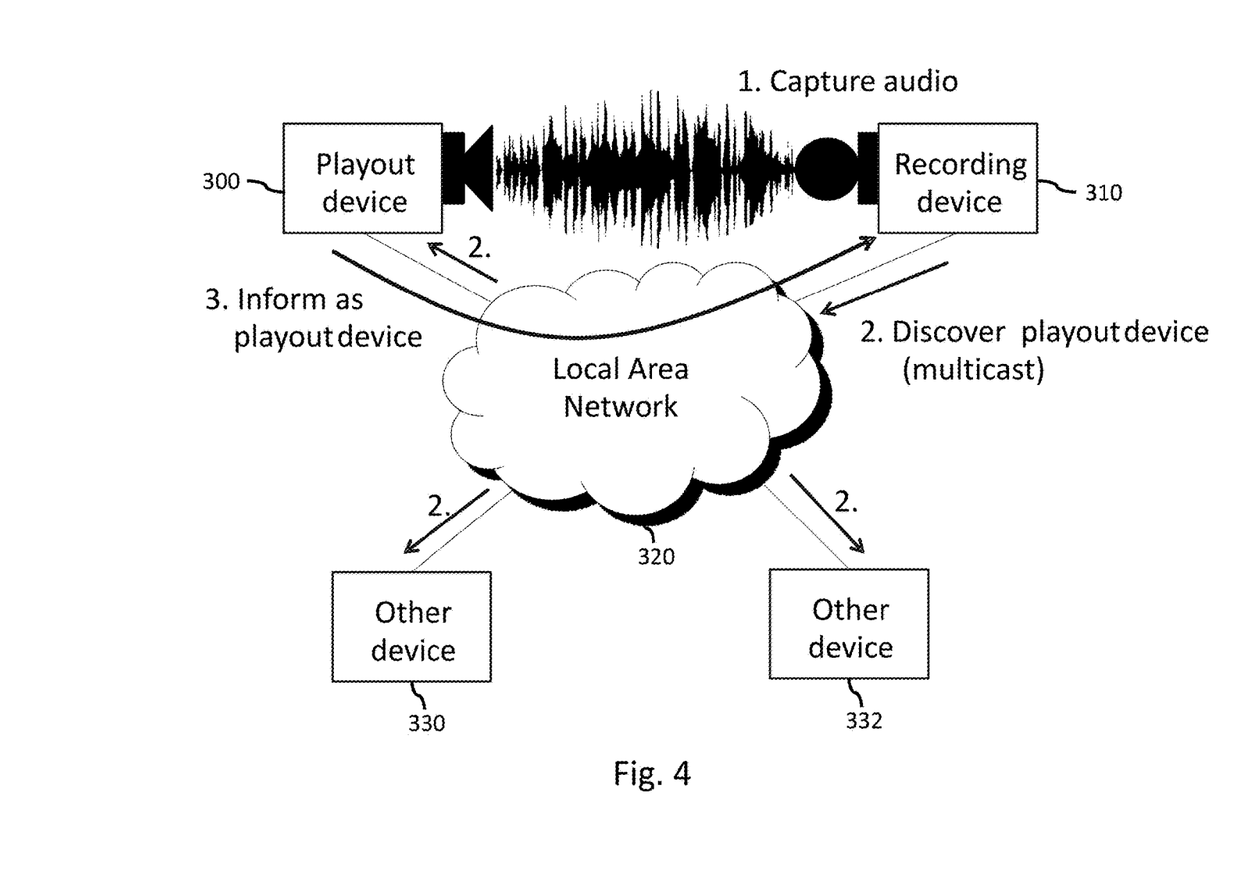
FIG. 4 shows a system in which the enhancing of the audio recording is performed locally, e.g., at a location where the audio recording is made, while also illustrating a first part of a message exchange between a play-out device and a recording device by which the audio signal is identified and retrieved.
Figure 5:
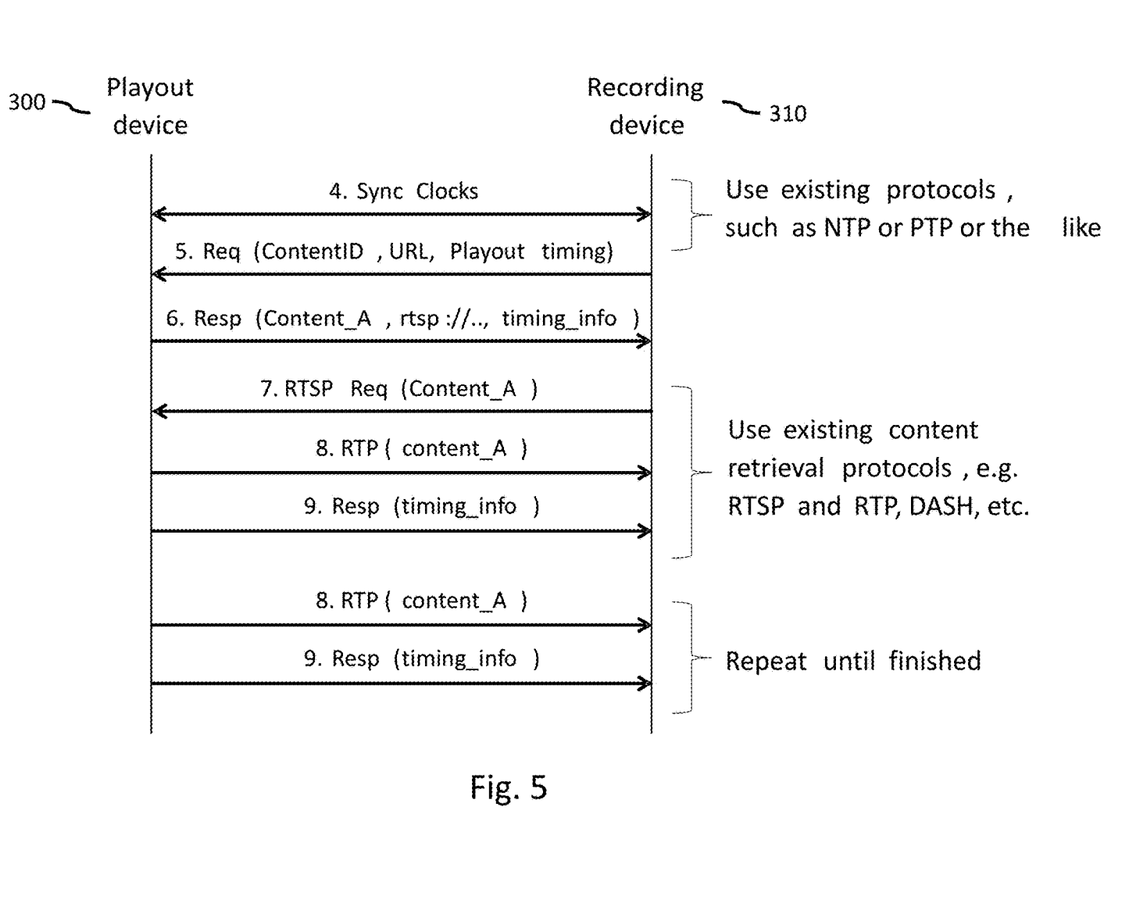
FIG. 5 shows a second part of the message exchange between the play-out device and the recording device by which the audio signal is identified and retrieved.

FIG. 4 shows a system in which the enhancing of the audio recording is performed locally, e.g., at a location where the audio recording is made, while also illustrating a first part of a message exchange between a local play-out device 300 and a local recording device 310 by which the audio signal is identified and retrieved by the recording device 310. FIG. 5 shows a second part of the message exchange between the play-out device and the recording device by which the audio signal is identified and retrieved. In this example, the recording device 310 suppresses the sound signal in the audio recording and inserts the original version of the audio content. As such, the recording device 310 may represent an embodiment of the system 100 of FIG. 3.

In step 1, represented by a corresponding numeral in FIG. 4, the recording device 310 may start capturing the audio from the acoustic domain. To discover the play-out device 300, the recording device 310 may send a multicast discovery message on the local area network 320 as a step 2, which may be performed before or after start of the recording. Other devices 330, 332 on the local area network 320 may receive the multicast discovery message as well. The play-out device 300, detecting that it is (possibly) the play-out device that the recording device 310 seeks to identify, may respond to the discovery message, informing the recording device 310 that it is currently playing-out an audio signal. It is noted that the discovery mechanism may be a known mechanism, known from protocols such as UPnP/DLNA or SLP, and will be discussed further with reference to "Detecting the play-out device" and "Discovery".

Having established a connection with the play-out device 300, the audio signal and the play-out timing may be identified, and the original version of the audio content may be retrieved, on the basis of a message exchange between the recording device 310 and the play-out device 300 as further shown in FIG. 5. Here, use may be made of the techniques described in PCT/EP2015/067548, and in particular the therein described timing information which allows the audio signal, or a more or less exact representation thereof, to be correlated in time with the recorded sound signal.

In step 4, the play-out device 300 and the recording device 310 may sync their clocks, using existing (or similar to) time synchronization protocols such as NTP or PTP. Such synchronization may be needed if the play-out timing is communicated in a timestamp format. In step 5, the recording device 310 may request the content ID, a possible URL to retrieve the content, e.g., the audio signal, and the play-out timing from the play-out device 300. In step 6, the play-out device 300 may indicate the content as being Content A, provide an RTSP URL to the recording device, indicating that the play-out device 300 can deliver the content, and further include the play-out timing. This play-out timing may comprise a reference wall clock, which is synchronized between play-out device 300 and recording device 310, and the content timestamp of the content that is played at the indicated moment in time. In step 7, the recording device 310 may retrieve the content from the play-out device using RTSP, shown very simplified in this figure, which the play-out device 300 may deliver in step 8. In step 9, the play-out device 300 may again deliver timing information, as the play-out may drift over time. Steps 8 and 9 may be repeated regularly, until the session ends. In longer sessions, step 4 may be repeated as well, not shown here for the sake of brevity. Here, RTSP and RTP are used to retrieve content, but any content delivery/retrieval mechanism may be used instead, e.g. DASH, HLS, MPEG-TS over UDP, multicast, etc. Note that the timing information provided by the play-out device may typically have to match the timestamps used in the delivery mechanism.

As a result of the above-described steps, the recording device 310 has access to the audio recording as well as to the original version of the audio content as represented by the sound signal in the audio recording. The recording device 310 may now suppress the sound signal using the original version of the audio content, e.g., using a 'noise' suppression or cancellation mechanism as described in PCT/EP2015/067548, and then insert the original version of the audio content.

Figure 6:
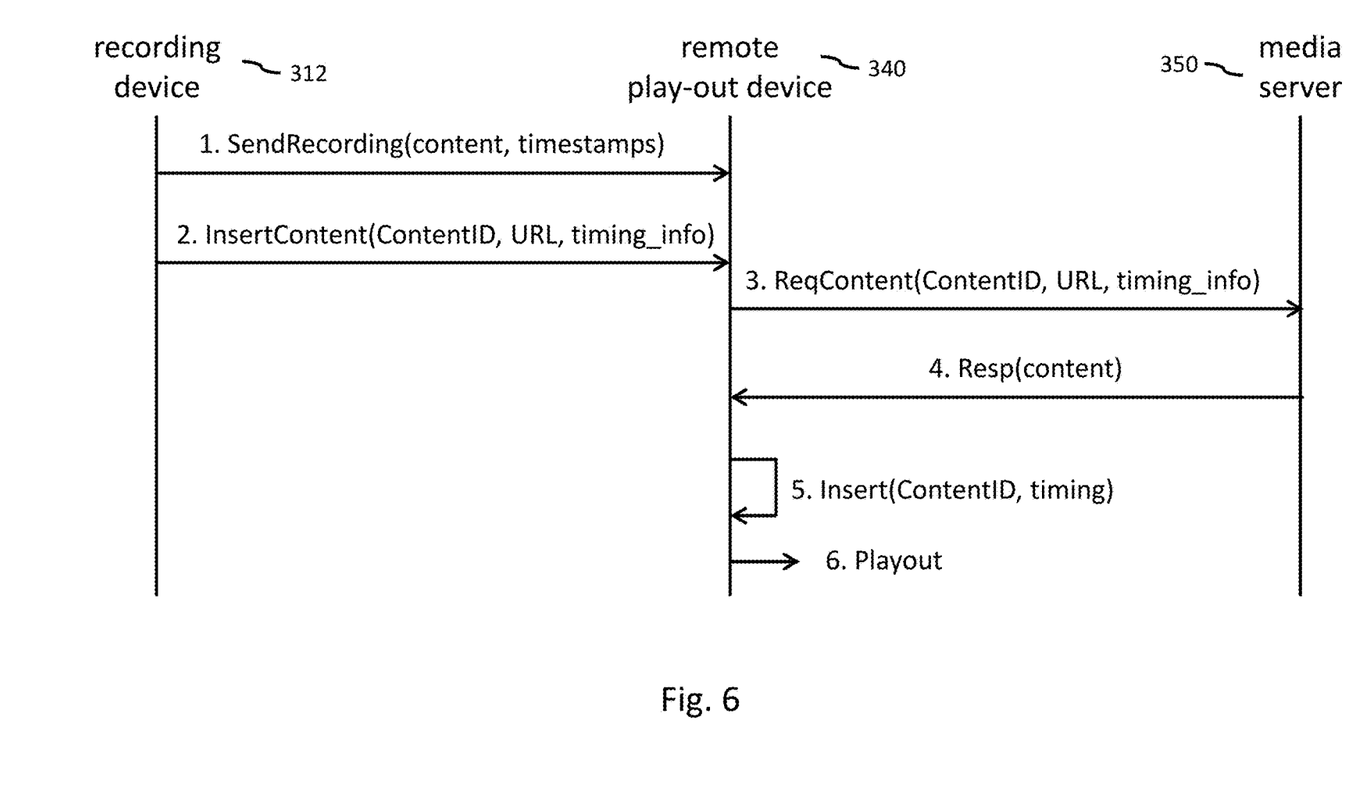
FIG. 6 shows a message exchange between a recording device and a play-out device which jointly perform the enhancement of the audio recording.

FIG. 6 shows a message exchange between a recording device 312 and a remote play-out device 340 which may jointly perform the enhancing of the audio recording. In this example, the suppression of the sound signal may be performed locally by the recording device 312, as was the case in FIGS. 4 and 5, while the insertion of the original version of the audio content may be performed remotely by a remote play-out device 340. For that purpose, the local recording device 312 may comprise the suppression subsystem 140 and the remote play-out device 340 may comprise the addition subsystem 150 of the system 100 of FIG. 3.

In step 1, the recording device 312 may send the intermediate audio recording, e.g., the audio recording with the sound signal having been suppressed, to the remote play-out device 340. To be able to indicate the timing of the suppressed sound signal, the audio recording may comprise timestamps, thereby establishing a content timeline for the audio recording. Next, in step 2, the recording device 312 may signal to the remote play-out device 340 which audio content the suppressed sound signal represented, possibly including a URL or other indicator of where to retrieve the content. Furthermore, in step 2, the recording device 312 may signal timing information.

For example, the intermediate audio recording may be sent using RTP, including RTP timestamps. In a specific example, the sound signal which has been suppressed may represent music playing in the background. The recording device 312 may now signal to the remote play-out device 340 which music is playing, e.g. using a publicly available music database such as freedb.org. Furthermore, the recording device 312 may signal at which RTP timestamp which part of the song is playing. For example, at RTP timestamp 15790320 (RTP timestamp converted to decimals for readability), the song is at 1 minute and 37.550 seconds from the start of the song.

In a next step 3, the remote play-out device 340 may retrieve the content, for example using the URL provided by the recording device 312 or using its own library or own available content. In the example of FIG. 6, the remote play-out device 340 may request a media server 350 to provide the content by forwarding the content ID as previously received from the recording device 312, possibly including the URL and timing information. The media server 350 may in step 4 respond by delivering the requested content. In step 5, this content may be inserted by the remote play-out device 340 and in step 6 an enhanced audio recording may be played-out.

The following describe further optional aspects and/or possible modifications of the general and specific embodiments of the system and method.

Detecting Play-Out Device

If the sound signal is obtained from the play-out of the audio signal by a play-out device, the play-out device may be detected using one or more of:

- If the audio recording is accompanied by a camera recording, an image analysis technique may be used to detect the play-out device in the camera recording. The image analysis technique may be locally performed by the recording device, or remotely by having the recording device forward the camera recording to a remote image analysis component. An example of such a remote image analysis component is http://idtv.me/. Suitable image analysis techniques are known per se from the fields of image analysis and computer vision, described in, e.g., "*Computer Vision: Algorithms and Applications*" by Richard Szelisk, 2010, consulted on 15 Apr. 2015 at http://szeliski.org/Book/drafts/SzeliskiBook_20100903_draft.pdf.
- The play-out device may announce its activity on a local network, for example using multicast DNS, DLNA, DIAL or other media protocols. As an example, such an announcement may be a message comprising "playing channel 1"; URL= . . . ". Alternatively, the play-out devices in a local network may be queried for their presence and activities. Both aspects will be further described with reference to 'Discovery'.
- A user may manually configure the presence and/or activities of play-out devices, e.g., via a graphical user interface.

Identifying Audio Content

Identifying the audio content, or identifying the audio signal and thereby the audio content, may comprise one or more of:

- The play-out device may signal which media is being played-out, e.g., by signalling a radio or TV station identifier ("BBC 1"), or may be queried for this information.
- The play-out device may provide additional information about the media source, such as an URL to the source of the media ("http://webserver/BBC1.mpd").
- The audio content may be identified by the processor system applying an automatic content recognition technique, such as a watermark detection technique or fingerprinting technique, to the audio recording to obtain an identification of the audio content, and identifying the audio signal using the identification of the audio content. This may require an index of such content with the appropriate type of identifier. Alternatively or additionally, a sample of the audio signal may be sent to an external (cloud) server, e.g. a web service, that analyses and identifies the audio signal by automatic content recognition of the sample, and informs the processor system of the identification of the audio content.
- Generally, the audio content may be identified by identifying visual content associated with the audio content. For example, the audio signal may be identified as the audio component of a movie. To identify the movie, or other types of such visual content, any known automatic content recognition technique may be used.
- The user may manually specify the media source, e.g., by identifying a play-out device presenting the source of the audio content being played-out.

Accessing Original Version of Audio Content

Accessing an original version of the audio content may involve the local play-out device itself providing said original version of the visual content, for example, by streaming a media stream in the form of an MPEG-DASH stream. Alternatively or additionally, a resource location may be identified which comprises said original version. For example, metadata made available to the processor system may contain a brief identification of the radio station which is being played-out, e.g., the identifier "BBC 1". The processor system may then identify and access the radio station "BBC 1", e.g., by streaming an audio stream of the radio station via the Internet.

In general, a resource location may be be signaled using the tv: URI scheme, URLs may be provided in manifest files, audio content may be identified using CRID content IDs, movie audio may be signaled using IMDB references, etc.

Inserting Original Version of Audio Content

Having obtained access to an original version of the audio content, the original version may be inserted into the intermediate audio recording, thereby obtaining the enhanced audio recording. Such inserting may be, but does not need to be, performed in real-time and in a synchronized manner, so that the audio content in the enhanced media recording is synchronized, to at least a certain degree, with the recording of the sound signal as previously comprised in the audio recording. This aspect will be further elucidated with reference to 'Synchronization of insertion'.

The insertion may be performed at various stages. For example, the insertion may be already performed in the recording device itself, such that an encoded version of the audio recording contains the original version. Another way is to have a remote device, such as a remote receiver device or a remote play-out device, access both the audio recording and the original version of the audio content, and insert the original version into the audio recording to obtain the enhanced audio recording. This aspect will be further elucidated with reference to 'System partitioning'. The insertion may also be performed during play-out of the audio recording. As such, the enhanced audio recording may not be separately stored but rather may be generated 'on the fly'.

The original version to be inserted may also be another original version of the audio content, e.g. of higher quality, more channels etc.

Synchronization of Insertion

There are at least three possible ways of synchronizing the insertion of the original version of the audio content with respect to the intermediate audio recording, e.g., with respect to the therein comprised foreground audio. If the original version of the audio content is inserted in one or more new audio tracks, such synchronization may also be performed before or during play-out of the enhanced audio recording.

Match the timing of the sound signal in the audio recording, thereby reproducing the time alignment of the local background audio and the local foreground audio. This may involve measuring the play-out timing at the local side, e.g., that of the local play-out device when being in sync with the (local) recording device.

Not using strict timing. For example, if the background audio is of a radio station, the live radio stream as currently retrieved may be reinserted. Namely, if the background audio is only part of the ambiance, it is not that important that the insertion is performed accurately. Rather, a timing shift of several seconds or even tens of seconds, compared to the suppressed sound signal, may be acceptable.

Match the timing of the remote background audio, thereby ensuring that during playback of the enhanced audio recording, the play-out of the background audio of the audio recording at the remote side is time aligned with the play-out of the same background audio remotely. This may be useful in case where the same audio signal is played-out at the local side as well as at the remote side. This may involve measuring the play-out timing at the remote side, e.g., the play-out timing of the remote play-out.

The latter matching may apply to the so-termed 'watching apart together' use case. In this case, the same content, e.g., the same audio signal, is played-out at two locations which are remote from each other. The play-out may be mutually synchronized. Also, users at both locations may be communicating with each other. As part of this communication, the sound signal as generated by the play-out of the content may be recorded at both locations and played-out through the communication channel at the other (remote) location. As the communication channel will introduce a delay, e.g., typically in the order of magnitude of 150 ms or more, the play-out of the content by way of the play-out of the audio recording will typically be delayed with respect to the local play-out of the content. In this case, since the play-out is synchronized across locations, and the content is already available at both locations, no timing information for inserting an original version has to be shared with the remote location, as the remote location may use its local play-out timing of the original content. When doing this, the background audio of the enhanced audio recording will be in synchrony with the local play-out of the content. Also, here, the remote side may perform the background audio suppression, as the remote side also has access to the same background audio as the local side.

System Partitioning

It will be appreciated that the processor system, including the suppression subsystem and the addition subsystem, may be part of a single device. However, both subsystems may also be part of different devices, or may be implemented in a distributed manner. A non-limiting example is that of a sender/receiver system in which, at a sender side, the audio recording may be obtained by a sender device, with the sender device then suppressing the sound signal in the audio recording to obtain an intermediate audio recording for transmission to a receiver device. At a receiver side, the receiver device may then insert the original version of the audio content into the intermediate audio recording, e.g., before or during play-out. Here, the sender device may comprise the first and second input interface and the suppression subsystem, and the receiver device may comprise at least the addition subsystem. A non-limiting example of such a system is a videoconferencing system.

It will be appreciated that the sender device may be a communication device functioning as recording device, and the receiver device may be another communication device, e.g., of the same type, functioning as play-out device.

However, the sender device may also be separate from the recording device. In such an example, the sender device, the speaker and the recording device may be co-located, e.g., in a same room, same building, same outside area. However, this is not a requirement, in that the sender device may be located at the sender side, e.g., at a 'sending' location, whereas the speaker may be located and recorded by the recording device elsewhere, e.g., at a different location, e.g., a 'recording' location. Likewise, the receiver device may be separate from the remote play-out device.

Discovery

Different discovery mechanisms may be employed for discovering the media content being played-out by a play-out device, so as to discover the audio content represented by the recording of the sound signal in the audio recording. For example, the system may actively poll a local area network so as to discover the presence of play-out devices in the network. Additionally or alternatively, the play-out device may multicast its presence to the system via a notification message.

Actively polling the network may be based on various protocols. One example is the UPnP protocol. Here, M-SEARCH may be used to first discover devices in the local network, either directly or through an UPnP server. An example of a discovery message is shown below. This is a general discovery message for discovering all UPnP devices. Instead of searching for all devices with ssdp:all, also discovery messages may be sent for specific devices, e.g., for media renderers.

An M-SEARCH may be multicasted on the local network, specifying what is being looked for, in this case all devices, for example in the form of:

M-SEARCH*HTTP/1.1
HOST: 239.255.255.250:1900
MAN: "ssdp:discover"
MX: 2 (seconds to delay response)
ST: ssdp:all (search for all devices)
USER AGENT: Android/4.3 UPnP/1.1 Smartphone/3.0 (example values)

The response may be a 200 OK message containing information on the device that responds, in this case the play-out device 012 being a MediaRenderer.

HTTP/1.1 200 OK
CACHE-CONTROL: max-age=1800
DATE: Sun, 22 Mar. 2015 08:49:37 GMT
EXT:
LOCATION: http://192.168.1.5/description
SERVER: android/4.3 UPnP/1.1 television/1.0
ST: ssdp:all
USN: uuid:2fac1234-31f8-11b4-a222-08002b34c003::urn:schemas-upnp-org:service:MediaRenderer:1
BOOTID.UPNP.ORG: 1426860725
CONFIGID.UPNP.ORG: 123456
SEARCHPORT.UPNP.ORG: 49152

Alternatively or additionally, the play-out device may also multicast its presence occasionally, which may be detected by the system. An example of an advertising message is shown below. This message is similar in content to the 200 OK message when responding to an M-SEARCH.

NOTIFY*HTTP/1.1
HOST: 239.255.255.250:1900
CACHE-CONTROL: max-age=1800
LOCATION: http://192.168.1.5/description NT: urn:schemas-upnp-org:service:MediaRenderer:1
NTS: ssdp:alive
SERVER: android/4.3 UPnP/1.1 television/1.0
USN: uuid:2fac1234-31f8-11b4-a222-08002b34c003::urn: schemas-upnp-org:service:MediaRenderer:1
BOOTID.UPNP.ORG: 1426860725
CONFIGID.UPNP.ORG: 123456
SEARCHPORT.UPNP.ORG: 49152

Note that the above examples are within the context of UPnP, while there exist various discovery protocols which may be used instead.

General Aspects

It will be appreciated that when using the audio signal to suppress the recording of the sound signal in the audio recording, it is not necessary to obtain exactly the data representing the audio signal having been played out. Namely, it suffices to obtain a copy of the audio signal, or another more or less exact representation thereof. For example, if an audio stream is played-out via the speaker, a different audio stream of the same audio signal may be used to suppress recording of the sound signal in the audio recording, with the different audio stream being different in that it may be differently encoded, originating from a different stream source, etc.

It is noted that the audio recording may be part of a media recording, which may comprise additional components, such as, e.g., a camera recording or in general a video component, one or more additional audio tracks, various metadata, etc. However, the media recording may also solely consist of the audio recording. Both terms may be used interchangeably where appropriate.

The audio recording may comprise multiple recordings of sound signals obtained from the play-out by different speakers. For example, TV audio and a radio may be playing at the same time. The system and method as described may be used to replace multiple of such sound signals in the audio recording by their respective original versions, thereby establishing the enhanced audio recording.

Furthermore, by adding the original version of the audio content as one or more new tracks to the intermediate audio recording, the play-out may be orchestrated upon play-out, e.g., by the remote play-out device. For example, if the remote play-out device has access to multiple speakers using a 5.1 surround set, the remote play-out device may play-out the foreground audio on the center speaker while playing-out he background audio on the main (front) speakers or the back speakers.

Other General Aspects

Figure 7:
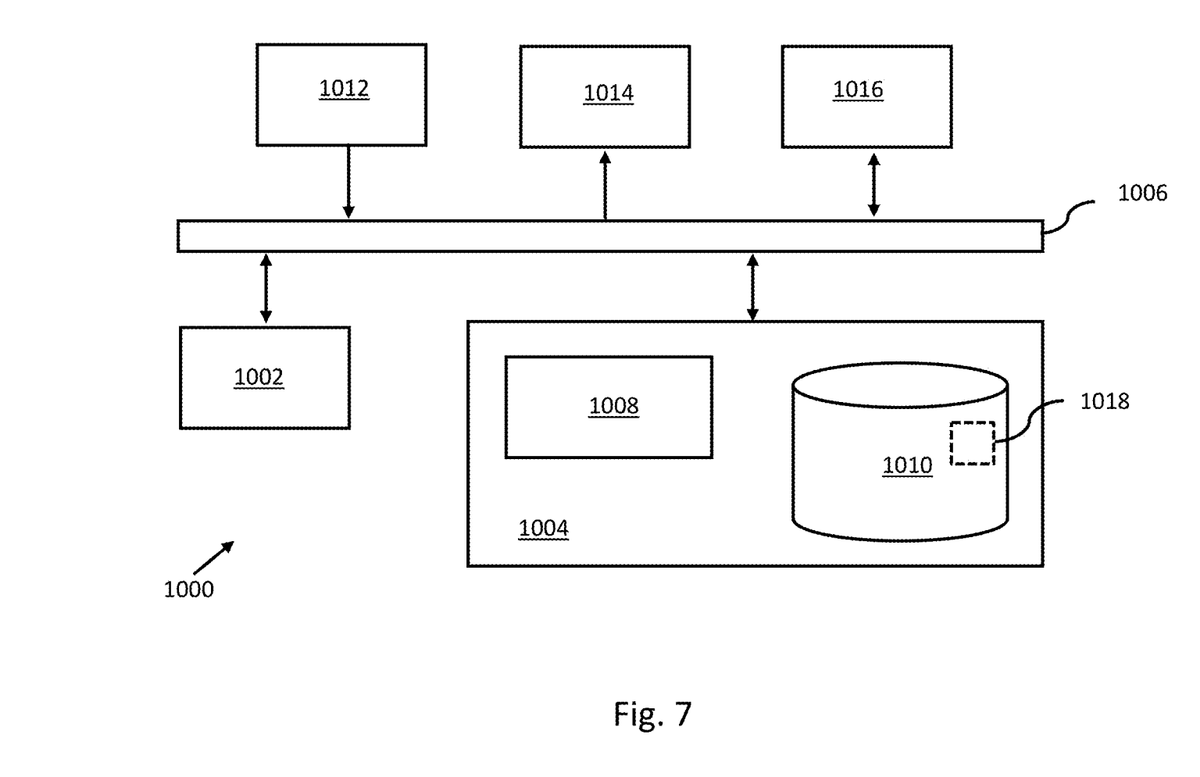
FIG. 7 shows an exemplary data processing system.

FIG. 7 is a block diagram illustrating an exemplary data processing system that may be used in the embodiments of this disclosure. Such data processing systems include data processing entities described in this disclosure, including the system for enhancing an audio recording, recording devices, remote or local play-out devices, sender devices, receiver devices, etc. Data processing system 1000 may include at least one processor 1002 coupled to memory elements 1004 through a system bus 1006. As such, the data processing system may store program code within memory elements 1004. Further, processor 1002 may execute the program code accessed from memory elements 1004 via system bus 1006. In one aspect, data processing system may be implemented as a computer that is suitable for storing and/or executing program code. It should be appreciated, however, that data processing system 1000 may be implemented in the form of any system including a processor and memory that is capable of performing the functions described within this specification.

Memory elements 1004 may include one or more physical memory devices such as, for example, local memory 1008 and one or more bulk storage devices 1010. Local memory may refer to random access memory or other non-persistent memory device(s) generally used during actual execution of the program code. A bulk storage device may be implemented as a hard drive, solid state disk or other persistent data storage device. The processing system 1000 may also include one or more cache memories (not shown) that provide temporary storage of at least some program code in order to reduce the number of times program code must be retrieved from bulk storage device 1010 during execution.

Input/output (I/O) devices depicted as input device 1012 and output device 1014 optionally can be coupled to the data processing system. Examples of input devices may include, but are not limited to, for example, a microphone, a keyboard, a pointing device such as a mouse, or the like. Examples of output devices may include, but are not limited to, for example, a monitor or display, speakers, or the like. Input device and/or output device may be coupled to data processing system either directly or through intervening I/O controllers. A network adapter 1016 may also be coupled to data processing system to enable it to become coupled to other systems, computer systems, remote network devices, and/or remote storage devices through intervening private or public networks. The network adapter may comprise a data receiver for receiving data that is transmitted by said systems, devices and/or networks to said data and a data transmitter for transmitting data to said systems, devices and/or networks. Modems, cable modems, and Ethernet cards are examples of different types of network adapter that may be used with data processing system 1000.

As shown in FIG. 7, memory elements 1004 may store an application 1018. It should be appreciated that data processing system 1000 may further execute an operating system (not shown) that can facilitate execution of the application. The application, being implemented in the form of executable program code, can be executed by data processing system 1000, e.g., by processor 1002. Responsive to executing the application, the data processing system may be configured to perform one or more operations to be described herein in further detail.

In one aspect, for example, data processing system 1000 may represent a system for enhancing an audio recording. In that case, application 1018 may represent an application that, when executed, configures data processing system 1000 to perform the various functions described herein with reference to a "system for enhancing an audio recording". In another aspect, data processing system 1000 may represent a device, such as a local or remote play-out device, a recording device, a sender device and/or a receiver device. In that case, application 1018 may represent an application that, when executed, configures data processing system 1000 to perform the various functions described herein with reference to "play-out device", "recording device", "sender device" and/or "receiver device". Examples of local or remote play-out devices can include, but are not limited to, audio systems, televisions, monitors, projectors, media players and recorders, set-top boxes, smartphones, PCs, laptops, tablet devices, etc. Examples of recording devices include, but are not limited to, audio recorders, compact cameras, professional cameras, smartphones, tablet devices, smart watches, smart glasses, etc. The sender device may be a recording device. The receiver device may be a remote play-out device.

In the claims, any reference signs placed between parentheses shall not be construed as limiting the claim. Use of the verb "comprise" and its conjugations does not exclude the presence of elements or steps other than those stated in a claim. The article "a" or "an" preceding an element does not exclude the presence of a plurality of such elements. The invention may be implemented by means of hardware comprising several distinct elements, and by means of a suitably programmed computer. In the device claim enumerating several means, several of these means may be embodied by one and the same item of hardware. The mere fact that certain measures are recited in mutually different dependent claims does not indicate that a combination of these measures cannot be used to advantage.

What is claimed is:

1. A method of enhancing an audio recording, comprising:
   accessing the audio recording, the audio recording comprising at least a recording of a sound signal, the sound signal being obtained from a play-out of an audio signal by a play-out device via a speaker, the audio signal representing audio content;
   accessing the audio signal from an external resource location;
   suppressing, in the audio recording, the recording of the sound signal using the audio signal, thereby obtaining an intermediate audio recording;
   adding an original version of the audio content to the intermediate audio recording to obtain an enhanced audio recording, the original version of the audio content being the audio signal or another original version of the audio content.

2. The method according to claim 1, wherein accessing the audio signal comprises:
   analyzing the audio recording to identify the audio signal;
   based on the audio signal having been identified, identifying a resource location which comprises the audio signal; and
   accessing the audio signal from the resource location.

3. The method according to claim 2, wherein identifying the audio signal comprises:
   applying an automatic content recognition technique to the audio recording to obtain an identification of the audio content; and
   identifying the audio signal using the identification of the audio content.

4. The method according to claim 3, wherein the automatic content recognition technique comprises one of a watermark detection technique and a fingerprint technique.

5. The method according to claim 2, wherein the sound signal is obtained from the play-out of the audio signal by the play-out device via the speaker, and wherein identifying the audio signal comprises obtaining play-out information from the play-out device which is indicative of the audio signal.

6. The method according to claim 5, wherein obtaining the play-out information comprises at least one of:
   querying the play-out device via a network for the play-out information; and
   the play-out device sending the play-out information via the network.

7. The method according to claim 1, further comprising accessing timing information enabling the audio signal to be correlated in time with the recording of the sound signal, and wherein suppressing the recording of the sound signal comprises:
   synchronizing the audio signal with the recording of the sound signal using the timing information to obtain a synchronized version of the audio signal; and
   suppressing, in the audio recording, the recording of the sound signal using the synchronized version of the audio signal.

8. The method according to claim 7, further comprising:
   adding the synchronized version of the audio signal to the intermediate audio recording; or
   synchronizing the other original version of the audio content to the audio recording to obtain a synchronized other original version, and adding the synchronized other original version to the intermediate audio recording.

9. The method according to claim 1, wherein the adding the original version of the audio content to the intermediate audio recording comprises inserting the original version into the audio recording as one or more additional audio tracks.

10. The method according to claim 9, further comprising encoding the one or more additional audio tracks using different encoding properties than used for encoding other audio tracks of the intermediate audio recording, the different encoding properties being preferably a different codec or a different bitrate setting.

11. The method according to claim 1, further comprising adjusting one or more audio properties of the original version of the audio content or of the intermediate audio recording, the one or more audio properties being at least one: a volume, a timing, a pitch, a balance between frequency components, and a parameter used in a parametric audio representation.

12. The method according to claim 1, wherein the audio recording is obtained by a sender device for transmission to a receiver device, wherein the suppressing of the recording of the sound signal in the audio recording is performed by the receiver device, and wherein the method further comprises:
   the sender device retrieving and subsequently transmitting the audio signal to the receiver device; or
   the sender device transmitting metadata to the receiver device which is indicative of a resource location from which the audio signal is accessible, and the receiver device retrieving the audio signal from the resource location based on the metadata.

13. A non-transitory computer-readable medium comprising a computer program, the computer program comprising instructions for causing a processor system to perform operations in a system for enhancing an audio recording, wherein the operations include:
   accessing the audio recording, the audio recording comprising at least a recording of a sound signal, the sound signal being obtained from a play-out of an audio signal by a play-out device via a speaker, the audio signal representing audio content;
   accessing the audio signal from an external resource location;
   suppressing, in the audio recording, the recording of the sound signal using the audio signal, thereby obtaining an intermediate audio recording;
   adding an original version of the audio content to the intermediate audio recording to obtain an enhanced audio recording, the original version of the audio content being the audio signal or another original version of the audio content.

14. A system for enhancing an audio recording, comprising:
   a first input interface configured for accessing the audio recording, the audio recording comprising at least a recording of a sound signal, the sound signal being obtained from a play-out of an audio signal by a play-out device via a speaker, the audio signal representing audio content;
a second input interface configured for accessing the audio signal from an external resource location; and
a processor system configured for:
suppressing, in the audio recording, the recording of the sound signal using the audio signal, thereby obtaining an intermediate audio recording, and
adding an original version of the audio content to the intermediate audio recording to obtain an enhanced audio recording, the original version of the audio content being the audio signal or another original version of the audio content.

15. A sender device configured for use in a system for enhancing an audio recording, the system comprising the sender device and a receiver device, the sender device comprising:
a first input interface configured for accessing the audio recording, the audio recording comprising at least a recording of a sound signal, the sound signal being obtained from a play-out of an audio signal by a play-out device via a speaker, the audio signal representing audio content; and
at least part of a processor system configured for:
suppressing, in the audio recording, the recording of the sound signal using the audio signal, thereby obtaining an intermediate audio recording;
transmitting the intermediate audio recording to the receiver device; and
retrieving and subsequently transmitting the audio signal to the receiver device; or
transmitting metadata to the receiver device which is indicative of a resource location from which the audio signal is accessible.

16. A receiver device configured for use in a system for enhancing an audio recording, the system comprising a sender device and the receiver device, the receiver device comprising:
a first input interface configured for:
receiving the audio recording from the sender device,
receiving from the sender device the audio signal or metadata indicative of a resource location from which the audio signal is accessible; and
at least part of a processor system configured for:
suppressing, in the audio recording, the recording of the sound signal using the audio signal, thereby obtaining an intermediate audio recording, and
adding an original version of the audio content to the intermediate audio recording to obtain an enhanced audio recording, the original version of the audio content being the audio signal or another original version of the audio content.

17. The receiver device according to claim 16, further comprising a second input interface for retrieving the audio signal from the resource location based on the metadata.

* * * * *